United States Patent
Jackson

(10) Patent No.: US 7,311,409 B2
(45) Date of Patent: Dec. 25, 2007

(54) TWO AXIS INDEPENDENT DRIVEN SINGLE HINGED GIMBALED MIRROR BEAM STEERER

(75) Inventor: John E. Jackson, Carol Stream, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 239 days.

(21) Appl. No.: 10/997,099

(22) Filed: Nov. 24, 2004

(65) Prior Publication Data
US 2006/0109573 A1    May 25, 2006

(51) Int. Cl.
*G02B 7/182* (2006.01)
(52) U.S. Cl. .................. 359/876; 359/900; 398/124
(58) Field of Classification Search ............ 359/838, 359/871, 872, 196, 223, 109, 202, 198, 225, 359/214, 877, 876, 900; 398/118, 140, 121, 398/124; 356/152, 141; 342/355; 126/438; 353/3; 350/632; 248/486; 701/13; 244/171
See application file for complete search history.

(56) References Cited

U.S. PATENT DOCUMENTS 4,798,462 A * 1/1989 Byren ................. 356/139.08
4,886,330 A * 12/1989 Linick ................. 359/212
4,930,493 A * 6/1990 Sallis ................. 126/600
5,390,040 A * 2/1995 Mayeux ................. 398/129
5,751,460 A * 5/1998 Harrell et al. ............ 359/198
5,903,380 A * 5/1999 Motamedi et al. ........ 359/224
6,219,593 B1 * 4/2001 Kroncke ................. 701/13

* cited by examiner

*Primary Examiner*—Stephone B. Allen
*Assistant Examiner*—Jennifer L. Doak

(57) ABSTRACT

A beam steerer comprising a mirror, a joint, and two linear actuators. The joint, which is attached to a periphery of the mirror is rotatable about two perpendicular axes. The linear actuators control rotational movement of the mirror about the two axes. A laser beam or other signal is reflected off of the mirror and redirected to define a field of regard and a focal point in front of the mirror. The beam steerer may be mounted behind a window of an object such that a plane of the window and the focal point coincides and a foot print of the field of regard of the beam through the window is smaller compared to a corresponding foot print when the beam directed onto the mirror is aligned with the joint and the alignment is maintained throughout the rotation of the mirror about the joint.

19 Claims, 6 Drawing Sheets

TWO AXIS INDEPENDENT DRIVEN SINGLE HINGED GIMBALED MIRROR BEAM STEERER

CROSS-REFERENCE TO RELATED APPLICATIONS

Not applicable.

STATEMENT RE: FEDERALLY SPONSORED RESEARCH/DEVELOPMENT

Not applicable.

BACKGROUND OF THE INVENTION

The present invention relates to a beam steerer, and more particularly to a reflective surface rotatable about a fulcrum with a focused beam directed onto the surface offset from the fulcrum such that the focused beam may be reflected off of the surface and directed through an aperture.

Optical communication relates to the transmission of speech, data, pictures or other information by light, and in this regard, optical communication has greatly enhanced global communication in today's society. For example, optical communication has helped to enable communication between two satellites orbiting the earth.

Generally, during the past 50 to 80 years, the development of optical communication has accelerated as the importance of world wide communication has increased. However, this development was impeded prior to the 1960s because a suitable light source was not available that could be focused. Prior to the 1960s, the only suitable light source was from a plurality of independent atomic radiators and even these light sources could not be focused into a narrow beam of light to be effective. During the 1960s, with the demonstration of the first laser, the focusability problem was overcome and communication in the optical wavelength was made possible and has since then greatly increased.

Since the 1960s, optical communication between two land based communications stations (i.e., fixed points) was made possible as well as optical communication between two satellites (i.e., moving objects). With respect to the land based communication stations, a laser beam carrying data may be pointed to a land based communication station to transmit data to such station. However, optical communication between two satellites was more difficult to accomplish. The reason is that the laser beam could not simply be pointed to the receiving satellite because the two satellites are continually in motion and as such the transmitting satellite as well as the receiving satellite was constantly in flux. In other words, the line of sight of the transmitting laser and the receiving satellite would constantly become misaligned such that the optical communication between the two satellites would constantly be interrupted.

One solution is to develop a laser beam that could track the movement of the transmitting satellite as well as the receiving satellite. In this regard, an inner outer gimbal was used to solve this problem. The prior art inner outer gimbal comprises an inner ring and an outer ring, and a mirror mounted to the inner ring. The inner and outer rings rotate about two axes that are perpendicular to each other. As such, a laser beam could be reflected off of the mirror and directed to a moving receiving satellite. Further, the inner outer gimbal enables the receiving satellite to receive a transmitted laser beam at different angles. Without the inner outer gimbal, the transmitted laser beam would have to be directed to the receiving satellite such that the transmitted laser beam would enter the receiver mounted to the receiving satellite in perfect alignment. However, with the inner outer gimbal, the transmitted laser beam could be reflected off its mirror to align the transmitted laser beam to the receiver.

Nonetheless, technological advances in other areas such as flight, global communication, communication systems utilizing satellites as well as other commercial ventures have created a need for devices that direct laser beams such as the inner outer gimbal to be become smaller, lighter, more reliable, quieter and have a smaller foot print through a conformal window.

BRIEF SUMMARY OF THE INVENTION

The needs identified above have been addressed by the device of the present invention. In this regard, although reference to the needs are made in this specification, this reference is not meant to limit the scope of the present invention in any respect but rather the references to the needs in the art are meant to illustrate by way of example only the benefits of the present invention.

The device of the present invention is a beam steerer. The beam steerer may comprise the following elements, namely, a mirror defining a reflective surface and a joint attached to the mirror about a periphery of the mirror. The joint may have two degrees of freedoms about which the mirror may rotate, namely first and second axes. The first and second axes may be perpendicular to each other, intersect each other defining a fulcrum and the fulcrum may be located in a plane of the mirror. The beam steerer may further comprise two linear actuators attached to the mirror to rotate the mirror about the first and second axes of the joint.

The beam steerer may be mounted onto a satellite or an airplane. More particular, the beam steerer may be mounted behind a window (i.e., aperture) of the satellite or airplane wherein the window may conform to a skin of the satellite or airplane. Further, the beam steerer may work cooperatively with a beam generator. In particular, the beam generator may produce a focused beam of light (i.e., laser beam) which is directed onto the reflective surface. The focused beam may further be directed onto the reflective surface such that it is offset from the fulcrum. Or, in other words, the focused beam is directed onto the reflective surface such that the fulcrum and directed beam are misaligned with each other.

After the focused beam is directed to the reflective surface, the focused beam may be reflected or otherwise directed through the aperture to a target. The beam directed through the aperture is controlled by rotating the mirror about the joint with the two linear actuators. In this regard, the focused beam is reflected off of an area on the mirror (i.e., area of reflection) which changes as the mirror rotates about the fulcrum. The reason is that the joint is attached to a periphery of the mirror and the focused beam generated from the beam generator is not aligned with the fulcrum. This constantly changing area of reflection defines a fulcrum in front of the mirror such that a footprint of the beam directed through the aperture is smaller compared to a corresponding footprint if the beam generated from the beam generator was directed onto the reflective surface, aligned with the fulcrum and the alignment is maintained as the reflective surface is rotated about the fulcrum. Moreover, the footprint may further be reduced by aligning a plane of the aperture with the focal point of the field of regard.

These components and arrangement of the beam steerer along with the beam steerer's position in relation to the conformal window and laser beam provides a beam steerer that is smaller compared to the prior art inner outer gimbal, lighter than the prior art inner outer gimbal, quieter compared to the prior art inner outer gimbal, and more durable compared to the prior art inner outer gimbal. Moreover, the foot print of the reflected laser beam through the aperture of the satellite or airplane may be smaller compared to the foot print of the reflected laser beam reflected off of the prior art inner outer gimbal.

The beam steerer of the present invention is smaller compared to the prior art inner outer gimbal arrangement discussed above. In particular, the prior art inner outer gimbal comprises the inner and outer rings which completely circumscribe the mirror. In contrast, the beam steerer of the present invention may have only a single joint attached to the mirror at a single point along a periphery of the mirror. In this regard, the beam steerer of the present invention does not completely circumscribe the mirror and as a result, requires less space.

Further, the beam steerer of the present invention is lighter compared to the prior art inner outer gimbal. In particular, as discussed above, the prior art inner outer gimbal comprises the inner and outer rings. These inner and outer rings add weight to the prior art inner outer gimbal. In contrast, the beam steerer of the present invention does not require the inner and outer rings. Rather, the beam steerer of the present invention may have only a single joint rotatable about two axes.

Additionally, the beam steerer of the present invention may be quieter compared to the prior art inner outer gimbal. In particular, the prior art inner outer gimbal uses slip rings for the rotation of the inner ring and the outer ring. These slip rings are used to provide two degrees of freedom to the prior art inner outer gimbal and provide the force to rotate the inner and outer rings. The problem with these slip rings is that they are noisy during operation. In contrast, the beam steerer of the present invention utilizes a single joint that permits rotation about two axes perpendicular to each other. Additionally, mirror rotation is controlled through two linear actuators that are quieter compared to the slip rings. Moreover, not only are the linear actuators/single joint quieter compared to the inner and outer rings of the prior art inner outer gimbal, the linear actuators/single joint is more durable compared to the prior art inner outer gimbal. In other words, the mean time between failures (MTBF) for the beam steerer of the present invention is greater compared to the MTBF of the prior art inner outer gimbal.

Furthermore, the beam steerer of the present invention may have a smaller foot print through the aperture (i.e., conformal window) compared to the foot print of the prior art inner outer gimbal. In particular, the beam steerer of the present invention shifts the location of reflection of the laser beam on the mirror as the mirror is rotated about the first axis of the joint. As such, the total angular range of the beam steerer may have an apex (i.e., focal point) between the conformal window and the location of reflection of the laser beam on the mirror. In contrast, the location of reflection of the prior art inner outer gimbal may be at the apex of the total angular range (i.e., field of regard) of the prior art inner outer gimbal. This creates a larger foot print of the laser beam through the conformal window compared to the beam steerer of the present invention.

BRIEF DESCRIPTION OF THE DRAWINGS

An illustrative and presently preferred embodiment of the invention is shown in the accompanying drawings in which:

FIG. 4b is a front view of the beam steerer illustrating an opposite extreme of the field of regard with respect to FIG. 4a;

DETAILED DESCRIPTION OF THE INVENTION

The drawings referred to herein are for the purposes of illustrating preferred embodiments of the present invention and not for the purpose of limiting the same. For example, FIGS. 1-6 illustrate a beam steerer 10 which is an aspect of the present invention, and more particularly, in FIG. 6, the beam steerer 10 is illustrated as transmitting information. This is merely for the purposes of illustrating the various aspects of the present invention and is not meant to limit the scope of the present invention in any respect. Accordingly, the beam steerer 10 of the present invention may also be configured to receive information. Both configurations of the beam steerer 10a (transmitting), 10b (receiving) is shown in FIG. 2. In particular, beam steerer 10a is configured to transmit information, and beam steerer 10b is configured to receive information.

Figure 1:
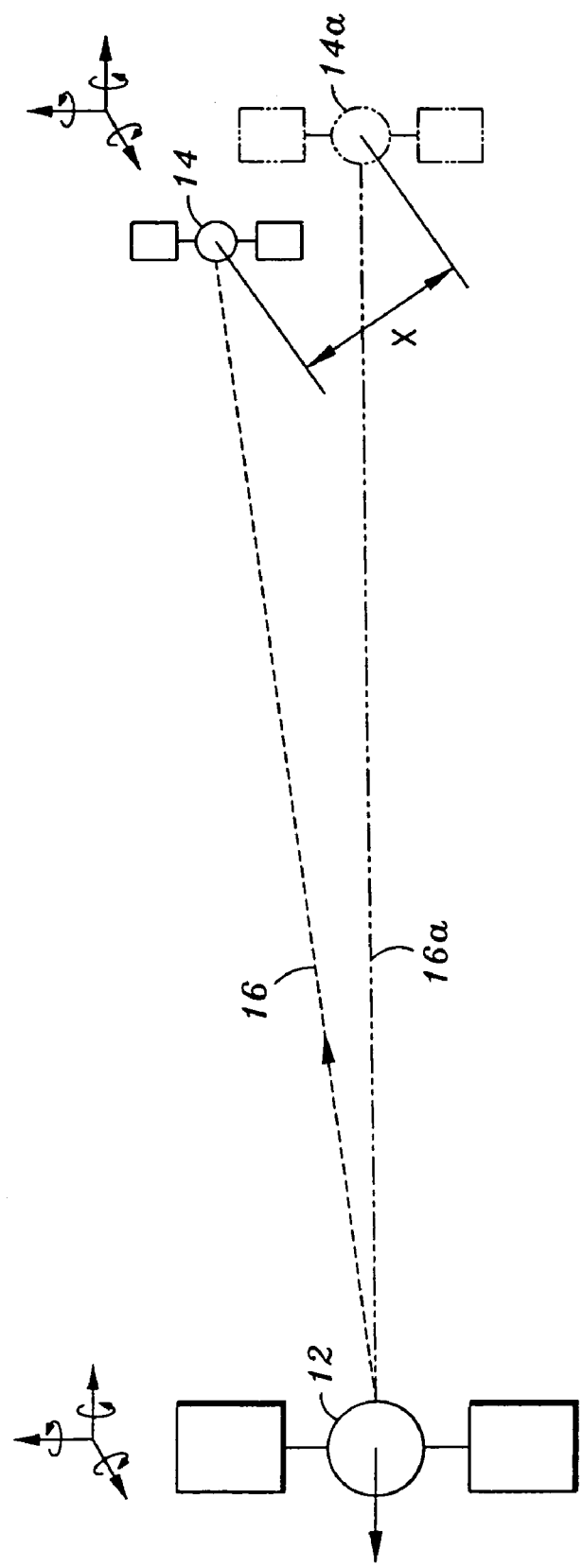
FIG. 1 is a perspective view of two satellites in optical communication with each other.
Figure 2:
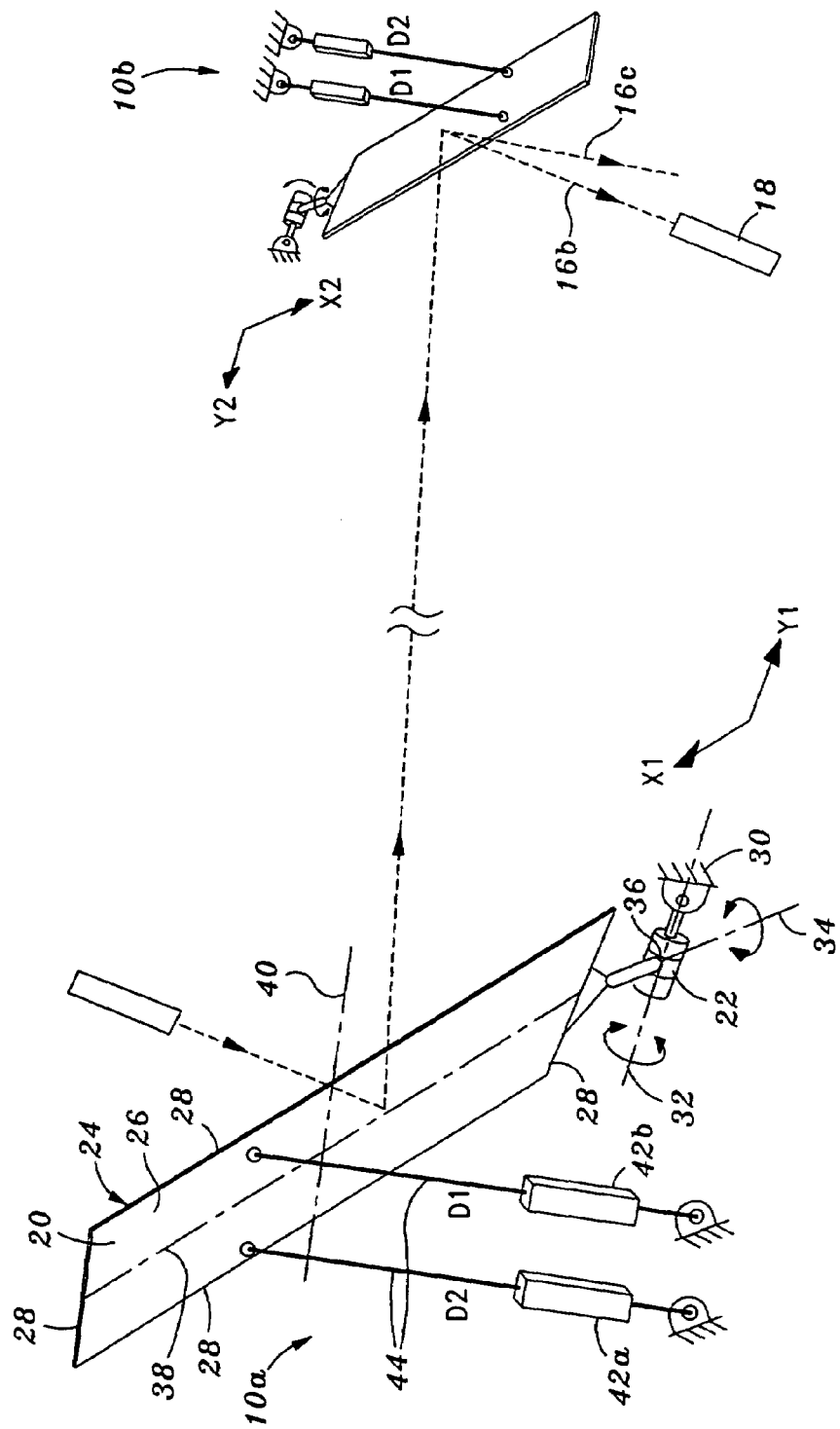
FIG. 2 is a perspective view of two beam steerers, one beam steerer is mounted on respective satellites of FIG. 1, the beam steerers are in optical communication with each other and illustrate the components of the beam steerer, namely mirror, joint and two linear actuators.

In an aspect of the present invention, the beam steerer 10 (see FIG. 2) disclosed in this specification may be mounted onto a transmitting 12 (see FIG. 1) as well as a receiving satellite 14 (see FIG. 1). For example, as shown in FIGS. 1 and 2, the beam steerer 10a may be mounted onto the transmitting satellite; and the beam steerer 10b may be mounted onto the receiving satellite. The terminology "receiving" and "transmitting" satellite is descriptive of the function of the satellite 12, 14 at the time the beam steerer 10 is operating rather than descriptive of structure of the satellites 12, 14. In other words, the two satellites 12, 14 may be in optical communication with each other and as they 12, 14 communicate, they will alternate between transmit and receive modes. In this regard, the beam steerer 10 may be utilized to transmit and/or receive information between two satellites, two airplanes, two submarines, or between a land based communication station and a satellite, airplane or other moving object. For the purposes of illustrating the aspects of the present invention, the two satellites 12, 14 will be referred to as the receiving satellite 14 and the transmitting satellite 12. For example, as shown in FIG. 1, the transmitting satellite 12 may be in optical communication with the receiving satellite 14 through a laser beam 16. The laser beam 16 may contain information such as position of satellite as well as other types of information such as voice, picture and data.

the transmitting and receiving satellites 12, 14 travel through space, the transmitted laser beam 16 from the transmitting satellite 12 may define a line of sight which becomes misaligned with the receiving satellite 14 because of the relative movements or travel of the satellites 12, 14. For example, as shown in FIG. 1, the receiving satellite 14a (shown in phantom lines) is shown as having traveled a distance "X." As such, the receiving satellite 16a currently does not receive the transmitted laser beam 16. Accordingly, the beam steerer 10 of the present invention may be mounted onto the transmitting satellite 12 to re-direct the line of sight of the transmitted laser beam 16a to the receiving satellite 16a.

Moreover, the beam steerer 10 may be mounted onto the receiving satellite 14. The purpose of the beam steerer 10b (see FIG. 2) being mounted onto the receiving satellite 14 is to redirect the transmitted laser beam 16, 16a in alignment with a receiver 18 (see FIG. 2). The receiver 18 is a device capable of receiving the laser beam 16 and processing the data contained in the laser beam 16. In other words, as the receiving satellite 14 travels through space, the transmitted laser beam 16, 16a approaches beam steerer 10b at a constantly changing angle. As such, the transmitted laser beam 16, 16a is redirected by the beam steerer 10b at constantly changing angles. In this regard, the redirected laser beam 16c is constantly being misaligned with the receiver 18 and must be constantly realigned with the receiver 18 such that the receiver may pick up and process the data contained therein. The constant realignment of the redirected laser beam 16c may be accomplished with the beam steerer 10b, as shown in FIG. 2.

In another aspect of the present invention, the beam steerer 10 may comprise a mirror 20 and a single joint 22 (see FIG. 2). The mirror 20 may define a front surface 24 and a back surface 26. The mirror 20 may define a periphery 28 and the periphery 28 may have a square (see FIG. 2), round, elliptical or other shape. The front surface 24 of the mirror 20 may reflect an incident signal such as a laser beam, and more particularly, may reflect the incident signal carrying information such as voice, pictures and other data. The incident signal reflected off of the front surface 24 may be labeled a reflected signal.

The mirror 20 may be attached to the joint 22, as shown in FIG. 2; and the joint 22 may be attached to a fixed inertial frame (e.g., satellite) 30. The joint 22 may have two degrees of freedom, namely rotation about a first axis 32 and a second axis 34. The first and second axis 32, 34 may be perpendicular to each other and intersect each other. The intersection of the first and second axis 32, 34 defines a fulcrum 36. The joint 22 may be attached to the mirror 20 at the periphery 28 of the mirror 20 such that the fulcrum 36 is positioned outside of the mirror periphery 28. In this regard, the mirror 20 may be rotatable about the first axis 32 as well as the second axis 34. Moreover, the movement of the mirror 20 may be about the fulcrum 36. In other words, the angle of the mirror 20 with respect to the inertial reference frame 30 may be altered about fulcrum 36. In sum, rotation of the mirror 20 about the first axis 32 may operate to rotate the mirror up and down (i.e., vertically). And, in contrast, rotation of the mirror 20 about the second axis 34 may operate to rotate the window left and right. Further, the mirror 20 may define a longitudinal axis 38 and a lateral axis 40. The joint 22 may be attached to the mirror 20 at the mirror periphery 28 and aligned to the longitudinal axis 38.

The mirror 20 may optionally be attached to two linear actuators 42a, 42b (see FIG. 2). The linear actuators 42a, b may each define first and second arms 44, 46. The linear actuators 42a, b may be operative to extend or shorten the distance between the first and second arms 44, 46. The linear actuator 42a may be independently extended or shortened. The extending or shortening of the linear actuators 42a, b may be manually controlled and preferably computer controlled. The first arms 44 may be attached to the back surface 26 of the mirror 20 with spherical ball joints 48 such that the actuators 42a, b may have a full range of movement with respect to the mirror 20; and, the second arms 46 may be attached to the inertial frame (e.g., satellite) 30 such that the actuator 42a, b may have a full range of movement with respect to the inertial frame 30. Accordingly, the mirror 20 may have a full range of movement with respect to the inertial frame 30 by shortening or extending appropriate linear actuators 42.

The first arms 44 may be attached to the mirror back surface 26 at approximately two thirds the distance of the mirror 20 along the longitudinal axis 38. And, the points of attachment between the first arms 44 and the mirror back surface 26 may form a line that is parallel to the lateral axis 40. The distance from the joint 22 to the attachment points of the first arms 44 to the mirror back surface 26 may be dependent upon the response time required for the laser beam (i.e., signal) to be redirected as the receiving satellite 14 moves out of the line of sight of the transmitted laser beam 16, and upon the accuracy of the laser beam 16 required to be able to direct the laser beam 16 to the receiving satellite 14.

Figure 3A:
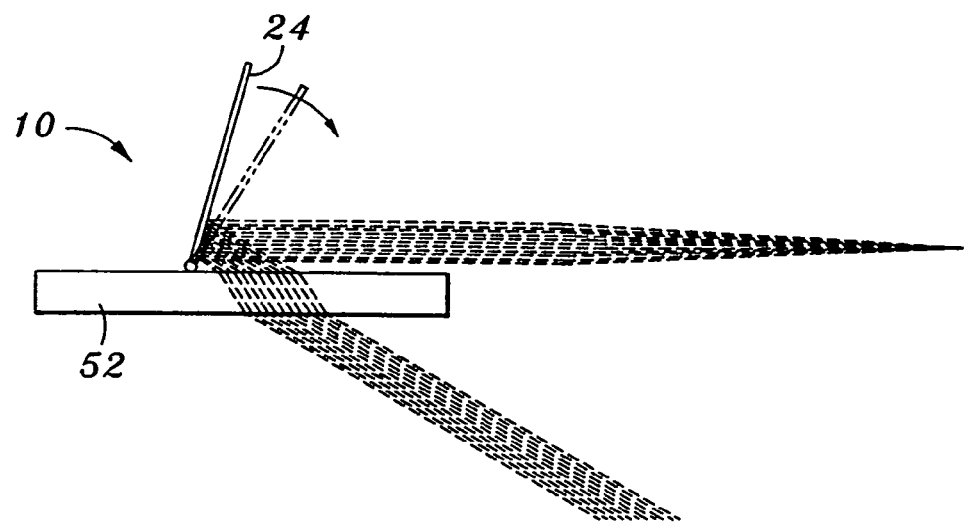
FIG. 3a is side view of the beam steerer illustrating one extreme of a field of regard.
Figure 3B:
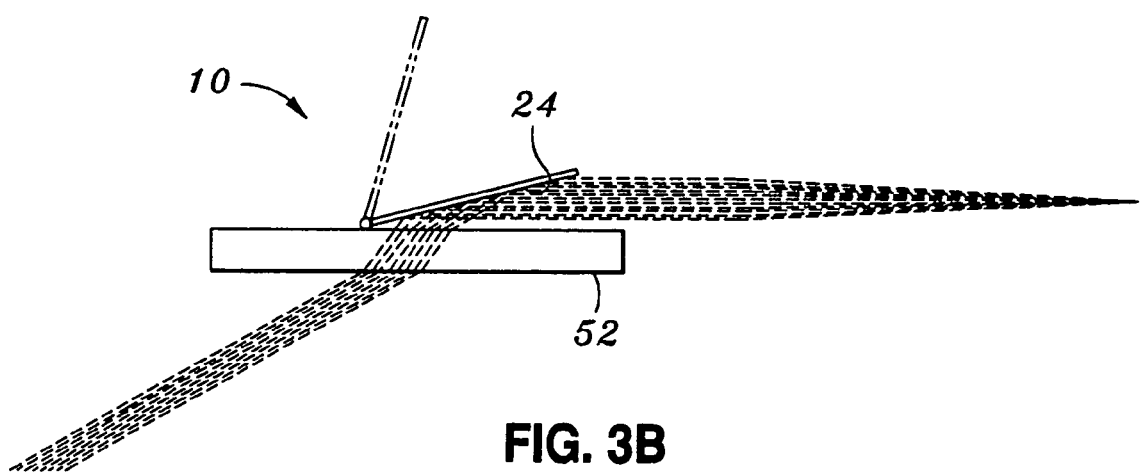
FIG. 3b is a side view of the beam steerer illustrating an opposite extreme of the field of regard with respect to FIG. 3a, the superimposition of FIGS. 3a and 3b illustrate a wide field of regard with respect to a small foot print through a conformal window.
Figure 4A:
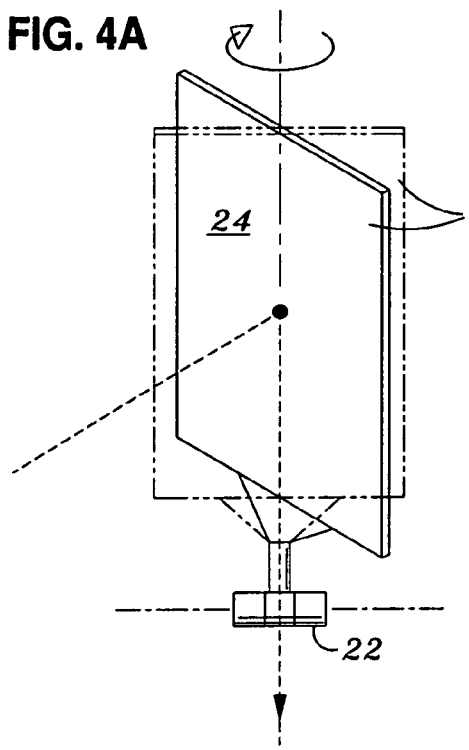
FIG. 4a is a front view of the beam steerer illustrating a one extreme of the field of regard in a transverse direction compared to FIGS. 3a and 3b.
Figure 4B:
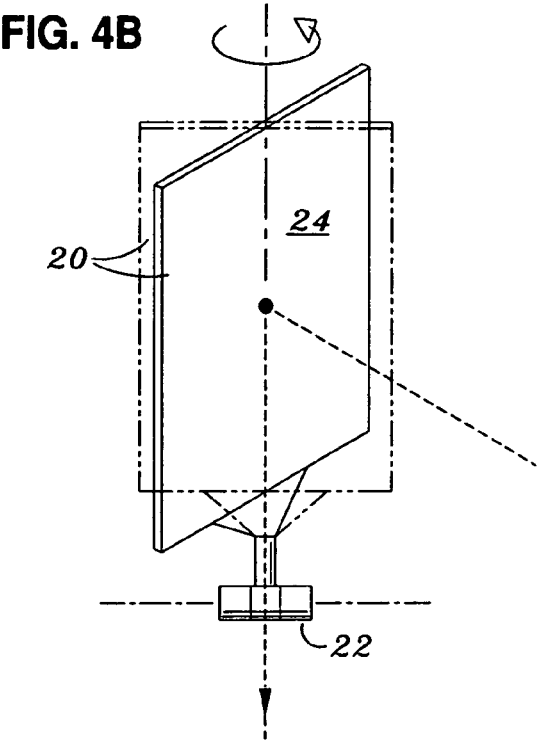
Figure 4C:
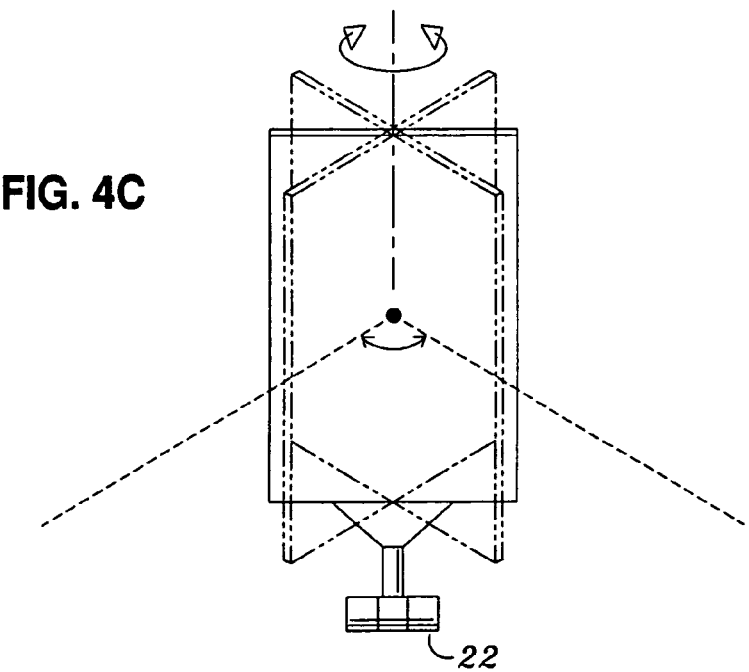
FIG. 4c is a front view of the beam steerer with FIGS. 4a and 4b superimposed upon each other.

The beam steerer 10 discussed above may define a field of regard. The field of regard is the total angular range at which the transmitted laser beam 16 may be directed. For example, the field of regard may be +/−40 degrees or +/−60 degrees. This angular description of the field of regard is shown in FIGS. 3a-3b and 4a-4c. In FIGS. 3a and 3b, the field of regard may be about +/−60 degrees as the mirror 20 is rotated about the first axis 32. In FIG. 4, the field of regard may be about +/−60 degrees as the mirror 20 is rotated about the second axis 34.

Figure 5:
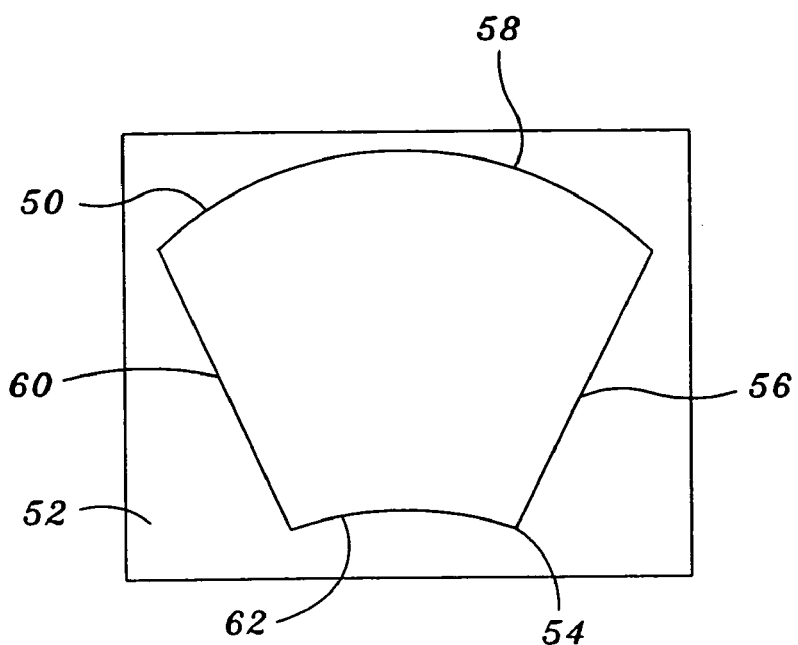
FIG. 5 is a top view of the conformal window illustrating an outline of the foot print of the laser beam through the conformal window.

To better understand the total angular range which defines the field of regard, FIG. 5 illustrates a foot print 50 of the laser beam 16 as it passes through a conformal window 52. The conformal window 52 is a window that conforms to the skin of the inertial reference frame (e.g., satellite). For simplicity and clarity, the deflection of the laser beam, signal or light through the conformal window 52 is not accounted for in FIG. 5. As shown in FIG. 5, the foot print 50 of the laser beam 16 may have an arc shape. In particular, this foot print represents the foot print of a laser beam 16 wherein the mirror 20 is rotated about the first and second axes 32, 34 in its extremities.

The foot print 50 shown in FIG. 5 corresponds to the following mirror movements/rotations about the first and second axes 32, 34. Point 54 represents a laser beam 16 passing through the conformal window as the mirror is fully rotated clockwise about the first axis 32 (see FIG. 3b), and fully rotated to the left about the second axis 34 (see FIG. 4a). Line 56 represents the laser beam 16 as the mirror 20 is fully rotated counterclockwise (i.e., as the mirror travels from its position shown in FIG. 3b to FIG. 3a). Line 58 represents the laser beam 16 as the mirror 20 is fully rotated to the right about the second axis 34 (i.e., as the mirror travels from its position shown in FIG. 4a to FIG. 4b). Line 60 represents the laser beam 16 as the mirror 20 is fully rotated clockwise about the first axis 32 (i.e., as the mirror travels from its position shown in FIG. 3a to FIG. 3b). Line 62 represents the laser beam 16 as the mirror 20 is fully rotated to the left about the second axis 34 (i.e., as the mirror travels from its position shown in FIG. 4b to FIG. 4a). This defines the field of regard in terms of the corresponding foot print 50 through the conformal window 52.

The field of regard, although discussed above in simple angular terms, has a complex angle. FIGS. 3a, 3b and corresponding FIG. 6 aid in explaining this complex angle. FIG. 3 illustrates the laser beam 16 as having a diameter and the conformal window 52 as having a thickness which is true in reality. However, FIG. 6 which is presented for the purpose of clarity and not limiting the scope of the present invention illustrates the laser beam 16 as an infinitesimally small diameter (i.e., line) and the conformal window as an infinitesimally thin window (i.e., no deflection). Hence, deflection of the laser beam through the window is not accounted for in FIG. 6.

Figure 6:
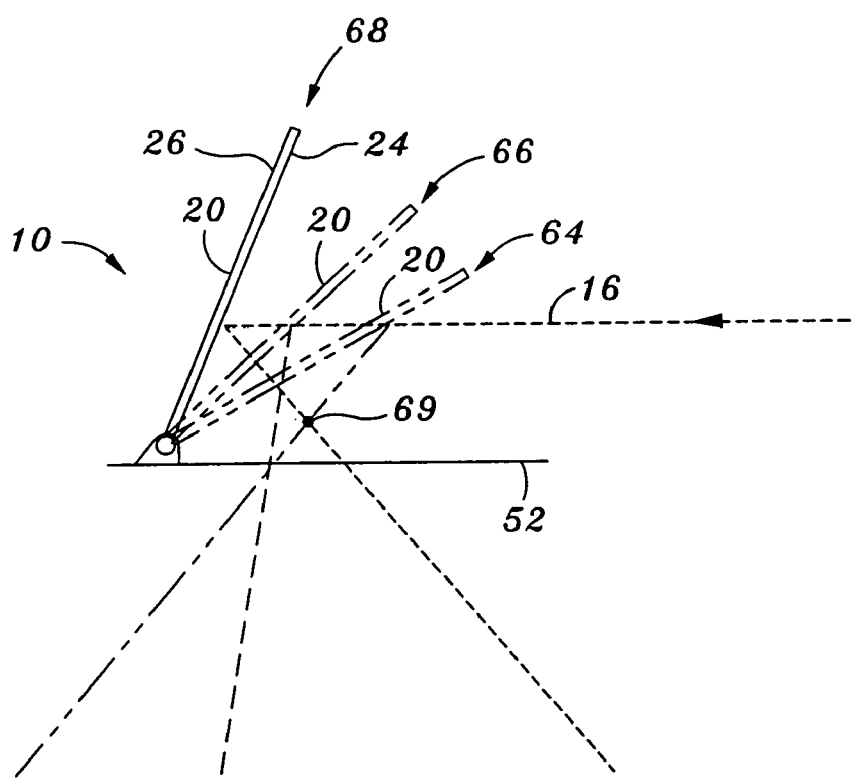
FIG. 6 is a corresponding side view of the beam steerer of FIG. 3 without accounting for deflection of the laser beam through a conformal window and beam diameter.

Now referring to FIG. 6 to aid in describing the complex angle, the same illustrates the laser beam 16 reflected off of the mirror 20 in three different positions 64, 66, 68. However, in each of the three different positions 64, 66, 68, the location of the reflection on the front surface 24 of the mirror 20 is different in all three different positions 64, 66, 68. In particular, in position 64, the location of the reflection is further from the joint 22 compared to the location of the reflection in position 68. Further, the location of the reflection travels from right to left as the mirror 20 traverses from position 64 to position 68. Hence, the total angular range is not simply +/-60 degrees measured from an apex, rather, total angular range (i.e., field of regard) may be measured from a theoretical apex (i.e., focal point) 69 derived from extreme range of movement of the mirror 20.

Figure 7:
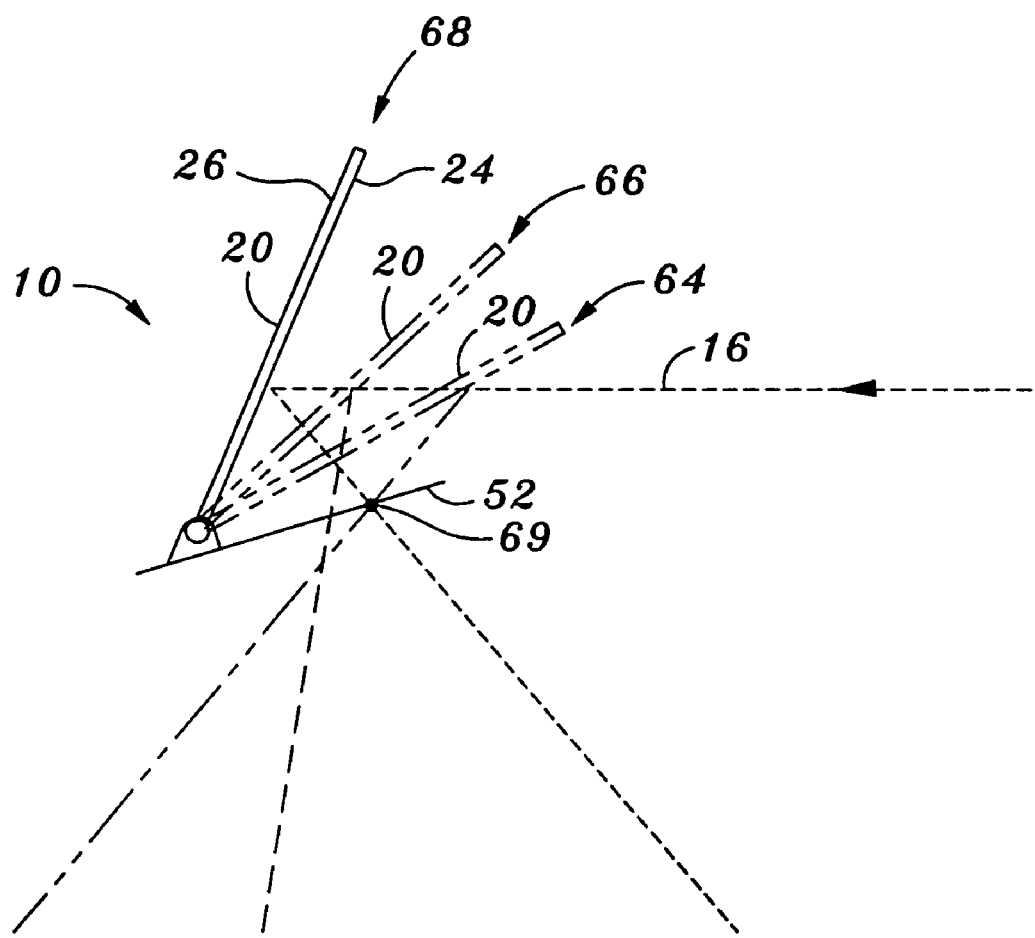
FIG. 7 is a side view of a beam steerer wherein the focal point 69 and the conformal window 52 are in the same plane.

The beam steerer 10 discussed above may be placed within an inertial reference frame 30. As stated above, the inertial reference frame 30 may be a satellite 12, 14 or a land based communication station. In either event, preferably, the beam steerer 10 along with the laser may be housed behind the conformal window 52. The conformal window 52 may be a transparent material conforming to the skin of the housing in which the beam steerer 10 is housed in. The laser beam 16 may be mounted to the housing such that the laser beam 16 is parallel with the conformal window 52, as shown in FIG. 6. For example, if the conformal window 52 is a flat window, then the laser beam 16 may be fixed in relation to the flat window such that the laser beam 16 is parallel with the flat window and is additionally directed toward the mirror 20 of the beam steerer 10. In the alternative, the laser beam 16 may be mounted to the housing such that the focal point 69 and the conformal window 52 are in the same plane, as shown in FIG. 7.

As stated above, the mirror 20 may define the longitudinal axis 38 and the joint 22 may be attached to the periphery of the mirror 20 aligned with the longitudinal axis 38. This may be referred to as a first point. And, on the opposite end of the mirror 20 at the periphery, the longitudinal axis 38 may intersect the periphery. This intersection may be referred to as the second point. In this regard, the first point (i.e., the joint 22) may be located adjacent the conformal window 52; and the second point may be located further away from the conformal window 523. In other words, the first point may be located closer to the conformal window 52 compared to the distance between the second point and the conformal window 52.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A method of maintaining a focused beam on a target, the focused beam being generated from the beam generator and projected from an object wherein the object and target are in motion with respect to each other, the method comprising the steps of:
    a) providing a reflective surface rotatable about a fulcrum, the reflective surface being offset from the fulcrum, wherein the fulcrum is defined by an intersection of a first and second axes that are perpendicular to each other;
    b) mounting the reflective surface to the object;
    c) directing the focused beam onto the reflective surface;
    d) rotating the reflective surface about at least one of the intersecting axes of the fulcrum in correspondence with the relative motion of the object and target to redirect and maintain the focused beam on the target as the object and target move in relation to each other; and
    e) wherein a footprint of a field of regard of the beam directed through an aperture is smaller compared to a corresponding footprint when the focused beam generated from the beam generator is directed onto the surface, aligned with the fulcrum, and the alignment is maintained during the rotating step.

2. The method of claim 1 wherein the fulcrum is locating in a plane of the surface.

3. The method of claim 2 wherein the fulcrum is located outside the periphery of the surface.

4. The method of claim 1 wherein the fulcrum is defined by two axes which are perpendicular to each other, intersect each other in a plane of the surface and about which the surface is rotatable.

5. The method of claim 1 wherein the surface is rotated about the fulcrum about both of the intersecting axes to direct the generated beam through the aperture to the target.

6. The method of claim 1 further comprising the step of positioning the reflective surface such that a focal point of the reflected beam is aligned to a plane of an aperture of the object.

7. A method of receiving a focused beam from an object to a target, the object being in motion with respect to each other, the method comprising steps of:
    a) providing a reflective surface rotatable about a fulcrum, the reflective surface being an offset from the fulcrum, wherein the fulcrum is defined by an intersection of a first and second axes that are perpendicular to each other;
    b) mounting the reflective surface to the target;
    c) receiving the focused beam on the reflective surface;
    d) rotating the reflective surface about at least one of the intersecting axes of the fulcrum in correspondence with the relative motion of the object and target redirect and maintain alignment of the focused beam to a beam receiver mounted to the target as the object and target move in relation to each other; and
    e) wherein a footprint of a field of regard of the beam directed through an aperture is smaller compared to a corresponding footprint when the focused beam generated from the beam generator is directed onto the surface, aligned with the fulcrum and the alignment is maintained throughout the rotation of the surface about the fulcrum.

8. The method of claim 7 wherein the fulcrum is located in a plane of the surface.

9. The method of claim 8 wherein the fulcrum is located outside a periphery of the surface.

10. The method of claim 7 wherein the fulcrum is defined by two axes which are perpendicular to each other, intersect each other in a plane of the surface and about which the surface is rotatable.

11. The method of claim 7 further comprising the step of positioning the reflective surface such that a focal point of the redirected beam is aligned to a plane of an aperture of the target.

12. The method of claim 7, wherein the surface is rotated about the fulcrum about both of the intersecting axes to direct the generated beam through the aperture to the target.

13. An object in optical communication with a target, the object comprising:
   a) a beam steerer mounted onto the object the steerer comprising:
      i. a reflective surface rotatable about a fulcrum, the fulcrum being defined by an intersection of first and second axes that are perpendicular to each other, the reflective surface being offset from the fulcrum;
      ii. at least one linear actuator attached to the reflective surface and operative to rotate the reflective surface about the fulcrum;
   b) a beam generator which generates a focused beam, the focused beam directed onto the reflective surface and reflected off of the reflective surface by rotating the reflective surface about at least one of the intersecting axes of the fulcrum to thereby direct the reflected beam to the target; and
   c) wherein a footprint of a field of regard of the beam directed through an aperture is smaller compared to a corresponding footprint when the focused beam generated from the beam generator is directed onto the surface, aligned with the fulcrum, and the alignment is maintained throughout the rotation of the surface about the fulcrum.

14. The object of claim 13 further comprising two linear actuators which are attached to the surface for rotating the surface about the fulcrum and independently controlled.

15. The object of claim 13 wherein the fulcrum is defined by two axes which are perpendicular to each other, intersect each other in a plane of the surface and about which the surface is rotatable.

16. The object of claim 13 wherein the fulcrum is located in a plane of the surface.

17. The object of claim 13 wherein the fulcrum is located outside a periphery of the surface.

18. The object of claim 13 wherein the field of regard further defines a focal point, and the focal point is located in a plane of the aperture.

19. The method of claim 13, wherein the surface is rotated about both of the intersecting axes of the fulcrum to direct the generated beam to the target.

* * * * *